(12) United States Patent
Ye (10) Patent No.: US 12,525,263 B2
(45) Date of Patent: Jan. 13, 2026

(54) METHOD OF VOLTAGE CALIBRATION AND APPARATUS THEREOF, MEMORY AND MEMORY SYSTEM

(71) Applicant: YANGTZE MEMORY TECHNOLOGIES CO., LTD., Wuhan (CN)

(72) Inventor: Tianyi Ye, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 191 days.

(21) Appl. No.: 18/370,644

(22) Filed: Sep. 20, 2023

(65) Prior Publication Data

US 2024/0379135 A1   Nov. 14, 2024

Related U.S. Application Data

(63) Continuation of application No. PCT/CN2023/092746, filed on May 8, 2023.

(51) Int. Cl.
*G11C 7/04* (2006.01)
*G11C 7/10* (2006.01)
*G11C 7/22* (2006.01)

(52) U.S. Cl.
CPC .............. *G11C 7/04* (2013.01); *G11C 7/1069* (2013.01); *G11C 7/222* (2013.01)

(58) Field of Classification Search
CPC ......... G11C 7/04; G11C 7/1069; G11C 7/222; G11C 29/021; G11C 16/26; G11C 29/028

USPC .......................................................... 365/211
See application file for complete search history.

(56) References Cited

U.S. PATENT DOCUMENTS

| | | | |
|---|---|---|---|
| 2017/0162270 A1 | 6/2017 | Park et al. | |
| 2022/0044737 A1* | 2/2022 | Khayat | G11C 11/5642 |
| 2022/0057934 A1* | 2/2022 | Sheperek | G11C 16/349 |
| 2022/0336023 A1* | 10/2022 | Muchherla | G11C 16/102 |

FOREIGN PATENT DOCUMENTS

CN   114724607 A   7/2022

\* cited by examiner

*Primary Examiner* — Huan Hoang
*Assistant Examiner* — Minh Dinh
(74) *Attorney, Agent, or Firm* — BAYES PLLC (57) ABSTRACT

According to one aspect of the present disclosure, a method of voltage calibration is provided. The method may include detecting a target temperature of a memory cell array. The method may include performing a read operation on the memory cell array at each of multiple candidate times with a standard read voltage. The method may include obtaining a number of target read fail bits. Each of the candidate times may correspond to one of the number of the target read fail bits. The method may include determining a target read voltage offset parameter according to the target temperature, the number of the target read fail bits, the candidate time, and a stored target offset function. The method may include calibrating the read voltage of the read operation on the memory cell array with the target read voltage offset parameter.

20 Claims, 3 Drawing Sheets

METHOD OF VOLTAGE CALIBRATION AND APPARATUS THEREOF, MEMORY AND MEMORY SYSTEM

CROSS-REFERENCE TO RELATED APPLICATIONS

This application is a continuation of International Application No. PCT/CN2023/092746, filed on May 8, 2023, which is incorporated herein by reference in its entirety.

TECHNICAL FIELD

The present disclosure relates to the technical field of semiconductors, and in particular to a method of voltage calibration and an apparatus thereof, a memory and a memory system.

BACKGROUND

With the progress of storage technology, the application of three-dimensional memory (e.g., 3D NAND flash memory chip) has become more extensive, such that three-dimensional memory may be applied to devices, e.g., such as mobile phone, computer, etc.

In a three-dimensional memory, when reading data from any memory cell, different read voltages may be sequentially applied to the control gate of the memory cell. Then, according to the on-state of the corresponding bit line to which different read voltages being applied, the result for the data read of the memory cell is determined.

SUMMARY

According to one aspect of the present disclosure, a method of voltage calibration is provided. The method may include detecting a target temperature of a memory cell array. The method may include performing a read operation on the memory cell array at each of multiple candidate times with a standard read voltage. The method may include obtaining a number of target read fail bits. Each of the candidate times may correspond to one of the number of the target read fail bits. The method may include determining a target read voltage offset parameter according to the target temperature, the number of the target read fail bits, the candidate time, and a stored target offset function. The method may include calibrating the read voltage of the read operation on the memory cell array with the target read voltage offset parameter.

In some implementations, the determining the target read voltage offset parameter according to the target temperature, the number of the target read fail bits, the candidate time, and the stored target offset function may include determining a first temperature-compensation time and a first temperature-compensation voltage corresponding to the target temperature. In some implementations, the determining the target read voltage offset parameter according to the target temperature, the number of the target read fail bits, the candidate time, and the stored target offset function may include determining a target read time offset parameter according to the number of the target read fail bits, the candidate time, and the standard read time. In some implementations, the determining the target read voltage offset parameter according to the target temperature, the number of the target read fail bits, the candidate time, and the stored target offset function may include inputting the target read time offset parameter, the first temperature-compensation time and the first temperature-compensation voltage into the stored target offset function to obtain the target read voltage offset parameter.

In some implementations, the determining the target read time offset parameter according to the number of the target read fail bits, the candidate time, and the standard read time may include determining the candidate time corresponding to the least number of the target read fail bits among the numbers of the target read fail bits as a target candidate time. In some implementations, the determining the target read time offset parameter according to the number of the target read fail bits, the candidate time, and the standard read time may include determining a difference between the target candidate time and the standard read time to obtain the target read time offset parameter.

In some implementations, before determining the target read voltage offset parameter according to the target temperature, the number of the target read fail bits, the candidate time, and the stored target offset function, the method may include placing the memory cell array at a benchmark temperature and a preset temperature respectively. In some implementations, before determining the target read voltage offset parameter according to the target temperature, the number of the target read fail bits, the candidate time, and the stored target offset function, the method may include performing a read operation on the memory cell array at any one of a plurality of preset read times with a standard read voltage. In some implementations, before determining the target read voltage offset parameter according to the target temperature, the number of the target read fail bits, the candidate time, and the stored target offset function, the method may include obtaining a first number of the target read fail bits and a second number of the target read fail bits. In some implementations, before determining the target read voltage offset parameter according to the target temperature, the number of the target read fail bits, the candidate time, and the stored target offset function, the method may include placing the memory cell array at the benchmark temperature and the preset temperature respectively. In some implementations, before determining the target read voltage offset parameter according to the target temperature, the number of the target read fail bits, the candidate time, and the stored target offset function, the method may include performing a read operation on the memory cell array with any one of a plurality of preset read voltages and a standard read time. In some implementations, before determining the target read voltage offset parameter according to the target temperature, the number of the target read fail bits, the candidate time, and the stored target offset function, the method may include obtaining a third number of the target read fail bits and a fourth number of the target read fail bits. In some implementations, before determining the target read voltage offset parameter according to the target temperature, the number of the target read fail bits, the candidate time, and the stored target offset function, the method may include determining a target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time. In some implementations, before determining the target read voltage offset parameter according to the target temperature, the number of the target read fail bits, the candidate time, and the stored target offset function, the method may include storing the target offset function.

In some implementations, the determining the target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time may include determining a temperature difference between each of the preset temperatures and the benchmark temperature, a time difference between each of the preset read times and the standard read time, and a voltage difference between each of the preset read voltages and the standard read voltage. In some implementations, the determining the target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time may include determining a benchmark mapping relationship of the read operation on the memory cell array at the benchmark temperature according to the time difference, the voltage difference, the first number of the target read fail bits, and the third number of the target read fail bits, the benchmark mapping relationship being a one-to-one correspondence between a plurality of read time offset parameters and a plurality of read voltage offset parameters. In some implementations, the determining the target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time may include determining the target offset function according to the benchmark mapping relationship, the time difference, the voltage difference, the temperature difference, the first number of the target read fail bits, the second number of the target read fail bits, the third number of the target read fail bits, and the fourth number of the target read fail bits.

In some implementations, the determining the benchmark mapping relationship of the read operation on the memory cell array at the benchmark temperature according to the time difference, the voltage difference, the first number of the target read fail bits, and the third number of the target read fail bits may include determining a difference of the numbers of bits between two of the first number of the target read fail bits corresponding to each of the time differences as a first difference. In some implementations, the determining the benchmark mapping relationship of the read operation on the memory cell array at the benchmark temperature according to the time difference, the voltage difference, the first number of the target read fail bits, and the third number of the target read fail bits may include determining a difference of the numbers of bits between two of the third number of the target read fail bits corresponding to each of the voltages differences as a third difference. In some implementations, the determining the benchmark mapping relationship of the read operation on the memory cell array at the benchmark temperature according to the time difference, the voltage difference, the first number of the target read fail bits, and the third number of the target read fail bits may include determining the benchmark mapping relationship according to the time difference, the first difference, the voltage difference, and the third difference.

In some implementations, the determining the target offset function according to the benchmark mapping relationship, the time difference, the voltage difference, the temperature difference, the first number of the target read fail bits, the second number of the target read fail bits, the third number of the target read fail bits, and the fourth number of the target read fail bits may include determining a difference between two of the second number of the target read fail bits corresponding to each of the time differences as a second difference. In some implementations, the determining the target offset function according to the benchmark mapping relationship, the time difference, the voltage difference, the temperature difference, the first number of the target read fail bits, the second number of the target read fail bits, the third number of the target read fail bits, and the fourth number of the target read fail bits may include determining a difference between two of the fourth numbers of the target read fail bits corresponding to each of the voltages differences as a fourth difference. In some implementations, the determining the target offset function according to the benchmark mapping relationship, the time difference, the voltage difference, the temperature difference, the first number of the target read fail bits, the second number of the target read fail bits, the third number of the target read fail bits, and the fourth number of the target read fail bits may include determining a first difference between the first difference and the second difference corresponding to each of the temperature differences. In some implementations, the determining the target offset function according to the benchmark mapping relationship, the time difference, the voltage difference, the temperature difference, the first number of the target read fail bits, the second number of the target read fail bits, the third number of the target read fail bits, and the fourth number of the target read fail bits may include determining a second difference between the third difference and the fourth difference corresponding to each of the temperature differences. In some implementations, the determining the target offset function according to the benchmark mapping relationship, the time difference, the voltage difference, the temperature difference, the first number of the target read fail bits, the second number of the target read fail bits, the third number of the target read fail bits, and the fourth number of the target read fail bits may include determining a benchmark relationship offset value according to the benchmark mapping relationship, the first difference, the second difference, and the temperature difference. In some implementations, the determining the target offset function according to the benchmark mapping relationship, the time difference, the voltage difference, the temperature difference, the first number of the target read fail bits, the second number of the target read fail bits, the third number of the target read fail bits, and the fourth number of the target read fail bits may include determining the target offset function according to the benchmark relationship offset value and the benchmark mapping relationship.

In some implementations, the determining the target offset function according to the benchmark relationship offset value and the benchmark mapping relationship may include obtaining a second temperature-compensation time and a second temperature-compensation voltage corresponding to each of the preset temperatures. In some implementations, the determining the target offset function according to the benchmark relationship offset value and the benchmark mapping relationship may include determining an initial offset function according to the benchmark relationship offset value. In some implementations, the determining the target offset function according to the benchmark relationship offset value and the benchmark mapping relationship may include determining the target offset function according to the initial offset function, the second temperature-compensation time, the second temperature-compensation voltage, and the benchmark mapping relationship.

According to another aspect of the present disclosure, an apparatus of voltage calibration is provided. The apparatus may include a temperature sensor configured to detect a current target temperature of a memory cell array. The apparatus may include a processing unit electrically connected to the memory cell array and the temperature sensor. The processing unit may be configured to perform a read operation on the memory cell array respectively at each of multiple candidate times with a standard read voltage. The processing unit may be configured to obtain a number of target read fail bits, each of the candidate times corresponding to one of the number of the target read fail bits. The processing unit may be configured to determine a target read voltage offset parameter according to the target temperature, the number of the target read fail bits, the candidate time, and a stored target offset function. The processing unit may be configured to calibrate a read voltage of a read operation on the memory cell array with the target read voltage offset parameter.

In some implementations, the processing unit may be configured to determine a first temperature-compensation time and a first temperature-compensation voltage corresponding to the target temperature. In some implementations, the processing unit may be configured to determine a target read time offset parameter according to the number of the target read fail bits, the candidate time, and the standard read time. In some implementations, the processing unit may be configured to input the target read time offset parameter, the first temperature-compensation time, and the first temperature-compensation voltage into the stored target offset function to obtain the target read voltage offset parameter.

In some implementations, the processing unit may be configured to determine the candidate time corresponding to the least number of the target read fail bits among the numbers of the target read fail bits as a target candidate time. In some implementations, the processing unit may be configured to determine a difference between the target candidate time and the standard read time to obtain the target read time offset parameter.

In some implementations, before determining the target read voltage offset parameter according to the target temperature, a number of the target read fail bits, the candidate time, and the stored target offset function, the processing unit may be configured to place the memory cell array at a benchmark temperature and a preset temperature respectively. In some implementations, before determining the target read voltage offset parameter according to the target temperature, a number of the target read fail bits, the candidate time, and the stored target offset function, the processing unit may be configured to perform a read operation on the memory cell array at any one of a plurality of preset read times with a standard read voltage. In some implementations, before determining the target read voltage offset parameter according to the target temperature, a number of the target read fail bits, the candidate time, and the stored target offset function, the processing unit may be configured to obtain a first number of the target read fail bits and a second number of the target read fail bits. In some implementations, before determining the target read voltage offset parameter according to the target temperature, a number of the target read fail bits, the candidate time, and the stored target offset function, the processing unit may be configured to place the memory cell array at the benchmark temperature and the preset temperature respectively. In some implementations, before determining the target read voltage offset parameter according to the target temperature, a number of the target read fail bits, the candidate time, and the stored target offset function, the processing unit may be configured to perform a read operation on the memory cell array with any one of a plurality of preset read voltages and a standard read time. In some implementations, before determining the target read voltage offset parameter according to the target temperature, a number of the target read fail bits, the candidate time, and the stored target offset function, the processing unit may be configured to obtain a third number of the target read fail bits and a fourth number of the target read fail bits. In some implementations, before determining the target read voltage offset parameter according to the target temperature, a number of the target read fail bits, the candidate time, and the stored target offset function, the processing unit may be configured to determine a target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time. In some implementations, before determining the target read voltage offset parameter according to the target temperature, a number of the target read fail bits, the candidate time, and the stored target offset function, the processing unit may be configured to store the target offset function.

In some implementations, to determine the target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time, the processing unit may be configured to determine a temperature difference between each of the preset temperatures and the benchmark temperature, a time difference between each of the preset read times and the standard read time, and a voltage difference between each of the preset read voltages and the standard read voltage. In some implementations, to determine the target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time, the processing unit may be configured to determine a benchmark mapping relationship of the read operation on the memory cell array at the benchmark temperature according to the time difference, the voltage difference, the first number of the target read fail bits, and the third number of the target read fail bits, the benchmark mapping relationship being a one-to-one correspondence between a plurality of read time offset parameters and a plurality of read voltage offset parameters. In some implementations, to determine the target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time, the processing unit may be configured to determine the target offset function according to the benchmark mapping relationship, the time difference, the voltage difference, the temperature difference, the first number of the target read fail bits, the second number of the target read fail bits, the third number of the target read fail bits, and the fourth number of the target read fail bits.

In some implementations, to determine the benchmark mapping relationship of the read operation on the memory cell array at the benchmark temperature according to the time difference, the voltage difference, the first number of the target read fail bits, and the third number of the target read fail bits, the processing unit may be configured to determine a difference of the numbers of bits between two of the first number of the target read fail bits corresponding to each of the time differences as a first difference. In some implementations, to determine the benchmark mapping relationship of the read operation on the memory cell array at the benchmark temperature according to the time difference, the voltage difference, the first number of the target read fail bits, and the third number of the target read fail bits, the processing unit may be configured to determine a difference of the numbers of bits between two of the third number of the target read fail bits corresponding to each of the voltages differences as a third difference. In some implementations, to determine the benchmark mapping relationship of the read operation on the memory cell array at the benchmark temperature according to the time difference, the voltage difference, the first number of the target read fail bits, and the third number of the target read fail bits, the processing unit may be configured to determine the benchmark mapping relationship according to the time difference, the first difference, the voltage difference, and the third difference.

In some implementations, to determine the target offset function according to the benchmark mapping relationship, the time difference, the voltage difference, the temperature difference, the first number of the target read fail bits, the second number of the target read fail bits, the third number of the target read fail bits, and the fourth number of the target read fail bits, the processing unit may be configured to determining a difference between two of the second number of the target read fail bits corresponding to each of the time differences as a second difference. In some implementations, to determine the target offset function according to the benchmark mapping relationship, the time difference, the voltage difference, the temperature difference, the first number of the target read fail bits, the second number of the target read fail bits, the third number of the target read fail bits, and the fourth number of the target read fail bits, the processing unit may be configured to determining a difference between two of the fourth number of the target read fail bits corresponding to each of the voltages differences as a fourth difference. In some implementations, to determine the target offset function according to the benchmark mapping relationship, the time difference, the voltage difference, the temperature difference, the first number of the target read fail bits, the second number of the target read fail bits, the third number of the target read fail bits, and the fourth number of the target read fail bits, the processing unit may be configured to determining a first difference between the first difference and the second difference corresponding to each of the temperature differences. In some implementations, to determine the target offset function according to the benchmark mapping relationship, the time difference, the voltage difference, the temperature difference, the first number of the target read fail bits, the second number of the target read fail bits, the third number of the target read fail bits, and the fourth number of the target read fail bits, the processing unit may be configured to determining a second difference between the third difference and the fourth difference corresponding to each of the temperature differences. In some implementations, to determine the target offset function according to the benchmark mapping relationship, the time difference, the voltage difference, the temperature difference, the first number of the target read fail bits, the second number of the target read fail bits, the third number of the target read fail bits, and the fourth number of the target read fail bits, the processing unit may be configured to determining a benchmark relationship offset value according to the benchmark mapping relationship, the first difference, the second difference, and the temperature difference. In some implementations, to determine the target offset function according to the benchmark mapping relationship, the time difference, the voltage difference, the temperature difference, the first number of the target read fail bits, the second number of the target read fail bits, the third number of the target read fail bits, and the fourth number of the target read fail bits, the processing unit may be configured to determining the target offset function according to the benchmark relationship offset value and the benchmark mapping relationship.

According to a further aspect of the present disclosure, an apparatus of voltage calibration is provided. The apparatus may include a memory including a memory cell array. The apparatus may include a processing unit coupled to the memory cell array. The processing unit may be configured to place the memory cell array at a benchmark temperature and a preset temperature respectively. The processing unit may be configured to perform a read operation on the memory cell array at any one of a plurality of preset read times with a standard read voltage. The processing unit may be configured to obtain a first number of the target read fail bits and a second number of the target read fail bits. The processing unit may be configured to place the memory cell array at the benchmark temperature and the preset temperature respectively. The processing unit may be configured to perform a read operation on the memory cell array with any one of a plurality of preset read voltages and a standard read time. The processing unit may be configured to obtain a third number of the target read fail bits and a fourth number of the target read fail bits. The processing unit may be configured to determine a target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time. The processing unit may be configured to store the target offset function in the memory.

In some implementations, the processing unit may be configured to determine a temperature difference between each of the preset temperatures and the benchmark temperature, a time difference between each of the preset read times and the standard read time, and a voltage difference between each of the preset read voltages and the standard read voltage. In some implementations, the processing unit may be configured to determine a benchmark mapping relationship of the read operation on the memory cell array in at the benchmark temperature according to the time difference, the voltage difference, the first number of the target read fail bits and the third number of the target read fail bits, the benchmark mapping relationship being a one-to-one correspondence between a plurality of read time offset parameters and a plurality of read voltage offset parameters. In some implementations, the processing unit may be configured to determine the target offset function according to the benchmark mapping relationship, the time difference, the voltage difference, the temperature difference, the first number of the target read fail bits, the second number of the target read fail bits, the third number of the target read fail bits, and the fourth number of the target read fail bits.

In some implementations, the processing unit may be configured to determine a benchmark mapping relationship of the read operation on the memory cell array at the benchmark temperature according to the time difference, the voltage difference, the first number of the target read fail bits and the third number of the target read fail bits, the benchmark mapping relationship being a one-to-one correspondence between a plurality of read time offset parameters and a plurality of read voltage offset parameters. In some implementations, the processing unit may be configured to determine the benchmark relationship offset value according to the benchmark mapping relationship, the time difference, the voltage difference, the temperature difference, the first number of the target read fail bits, the second number of the target read fail bits, the third number of the target read fail bits, and the fourth number of the target read fail bits. In some implementations, the processing unit may be configured to determine the target offset function according to the benchmark relationship offset value and the benchmark mapping relationship.

In some implementations, the processing unit may be configured to determine a difference between two of the first number of the target read fail bits corresponding to each of the time differences as a first difference. In some implementations, the processing unit may be configured to determine a difference between two of the second number of the target read fail bits corresponding to each of the time differences as a second difference. In some implementations, the processing unit may be configured to determine a difference between two of the third number of the target read fail bits corresponding to each of the time differences as a third difference. In some implementations, the processing unit may be configured to determine a difference between two of the fourth number of the target read fail bits corresponding to each of the voltages differences as a fourth difference. In some implementations, the processing unit may be configured to determine a first difference between the first difference and the second difference corresponding to each of the temperature differences. In some implementations, the processing unit may be configured to determine a second difference between the third difference and the fourth difference corresponding to each of the temperature differences. In some implementations, the processing unit may be configured to determine the benchmark relationship offset value according to the benchmark mapping relationship, the first difference, the second difference, and the temperature difference. In some implementations, the processing unit may be configured to determine the target offset function according to the benchmark relationship offset value and the benchmark mapping relationship.

In some implementations, the processing unit nay be configured to obtain a second temperature-compensation time and a second temperature-compensation voltage corresponding to each of the preset temperatures. In some implementations, the processing unit nay be configured to determine an initial offset function according to the benchmark relationship offset value. In some implementations, the processing unit nay be configured to determine the target offset function according to the initial offset function, the second temperature-compensation time, the second temperature-compensation voltage, and the benchmark mapping relationship.

DETAILED DESCRIPTION

The application will be described in further detail below in combination with the accompanying drawings and examples. In particular, the following examples are only for the purpose of illustrating the present disclosure, but not to limit the scope of the present disclosure. Likewise, the following examples are only some examples of the present disclosure rather than all the examples, and all other examples obtained by those skilled in the art without making creative efforts belong to the claimed scope of the present disclosure.

In the description herein, the terms "first" and "second" are used for descriptive purposes only, and should not be understood as indicating or implying relative importance or implicitly specifying the quantity of indicated technical features. Thus, a feature defined as "first" and "second" may explicitly or implicitly include one or more of these features.

It should also be understood that the terms "comprising" and/or "containing" as used herein specify the presence of stated features, integers, operations, units and/or components, but do not exclude the presence or addition of one or more other features, integers, operations, units, components and/or combinations thereof.

Figure 1:
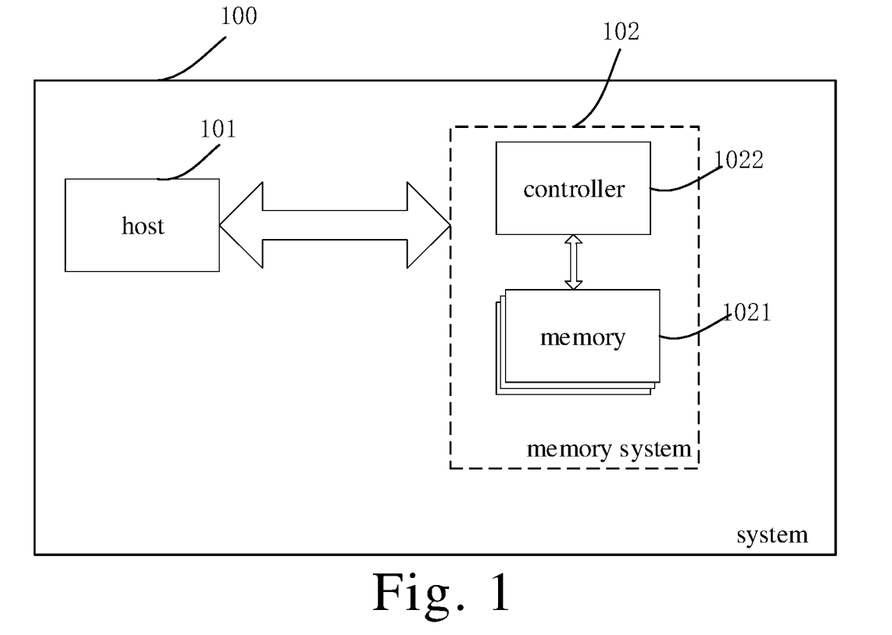
FIG. 1 is a schematic diagram of a structure of a system provided by an example of the present disclosure.

FIG. 1 is a schematic diagram of a structure of a system 100 provided by an example of the present disclosure. The system 100 may be, e.g., a mobile phone, a desktop computer, a laptop computer, a tablet, a vehicle computer, a gaming console, a printer, a positioning device, a wearable electronic device, a smart sensor, a Virtual Reality (VR) device, an Augmented Reality (AR) device, or any other suitable electronic devices having memory device therein. As shown in in FIG. 1, system 100 may include a host 101 and a memory system 102, and the memory system 102 includes one or more memory 1021 and a controller 1022. The host 101 may be a processor of an electronic device (e.g., a Central Processing Unit (CPU)) or a System on Chip (SoC) (e.g., an Application Processor (AP)). Host 101 may be configured to send data to or receive data from memory 1021.

In the example of the present disclosure, the memory 1021 is not limited to a three-dimensional NAND memory, and the memory 1021 may be implemented as other various types of non-volatile memory capable of retaining stored data when the power is turned off, without departing from the scope of the present disclosure.

In some examples, the controller 1022 is coupled to the memory 1021 and the host 101, and configured to control the memory 1021. For example, the controller 1022 may control the memory 1021 to perform an operation of writing and reading data. The controller 1022 may manage data stored in the memory 1021 and communicate with the host 101.

The controller 1022 may be configured to control operations of the memory 1021, e.g., such as reading, writing, erasing, and programming operations. The controller 1022 may be further configured to manage various functions related to data stored or to be stored in memory 1021, including but not limited to bad block management, garbage collection, logical-to-physical address translation, wear leveling, etc.

The controller 1022 and memory 1021 (e.g., one or more memories) may be integrated into various types of storage devices, e.g., included in the same package (e.g., Universal Flash Storage (UFS) package or eMMC package). That is, memory system 102 may be implemented and packaged into different types of electronic products.

Figure 2:
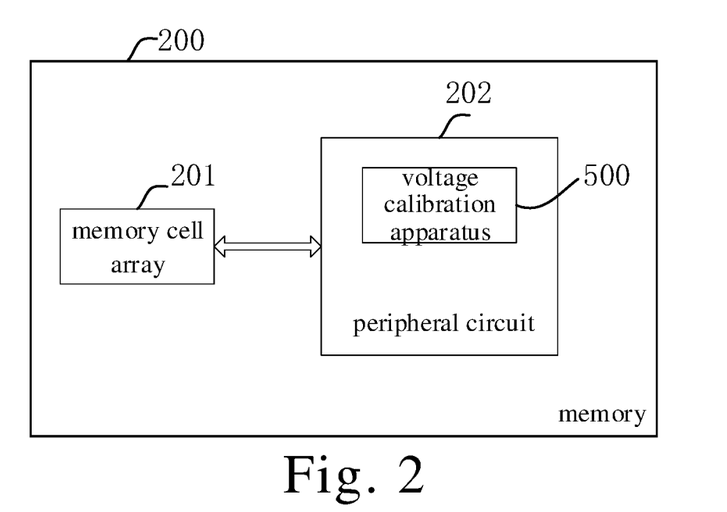
FIG. 2 is a schematic diagram of a structure of a memory provided by an example of the present disclosure.

FIG. 2 is a schematic diagram of a structure of a memory 200 provided by an example of the present disclosure. The memory 200 may include a memory cell array 201 and a peripheral circuit 202 coupled to the memory cell array 201. The peripheral circuit 202 may be configured to perform operations, e.g., such as reading, writing, erasing, and verifying on the memory cell array 201. The peripheral circuit 202 may include any apparatus of voltage calibration 500 described below.

In some examples, the peripheral circuit 202 may also include a word line driver, a bit line driver, a column decoder, a sensing circuit, a data buffer, a program verification logic and an erasure verification circuit, etc., which may perform the operations described above according to obtained computer program instructions.

The memory cell array 201 may include a plurality of memory blocks, each bock is logically divided into a plurality of pages, each page includes a plurality of memory cells, a page is the smallest unit of operations for reading and writing of data, and a block is the smallest unit of data erasing operation. According to the amount of data that may be stored in each memory cell, the memory cell may be divided into various types, e.g., such as a Single-Level Cell (SLC) that can store one bit of data, and a Multi-Level Cell (MLC) that can store two bits of data, and a Triple-Level Cell (TLC) that can store three bits of data, etc.

For a single memory cell in the memory cell array 201, it has different memory states when it stores different numbers of electrons, e.g., when the memory cell is a TLC type, it has 8 memory states, corresponding to "111", "110", "100", "000", "010", "011", "001" and "101", respectively. Different memory states correspond to different threshold voltages. Generally, for a memory cell with any of the memory states, when the read voltage applied to its control gate (equivalent to a word line) is greater than or equal to the threshold voltage of the corresponding memory state, the memory cell may be in on-state. In this way, for a memory cell, different read voltages may be sequentially applied to the control gate of the memory cell. Then, the memory state of the memory cell may be determined according to the on-state of the corresponding bit line after being applied different read voltages, and the result for the data read of the memory cell may be in turn determined.

However, as the number of reads and writes and the duration of use increase, the memory 200 itself will wear to a certain extent, and changes in the use environment will also affect the performance of the memory 200. This may cause the read voltage to offset during the read operation, and the read voltage with an offset will cause errors when reading data. Therefore, the read voltage needs to be calibrated. To overcome this and other challenges, the present disclosure provides an exemplary method of voltage calibration and apparatus thereof, a memory and a memory system.

Figure 3:
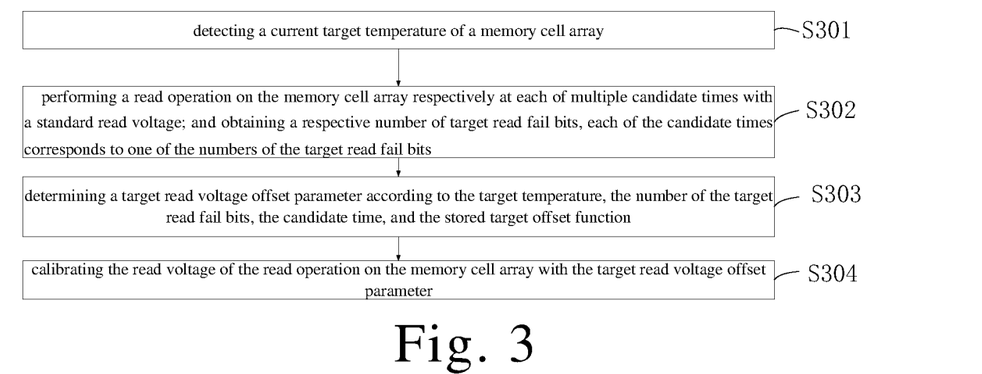
FIG. 3 is a schematic flowchart of a method of voltage calibration provided by an example of the present disclosure.

A schematic flowchart of a method of voltage calibration provided by an example of the present disclosure is shown in FIG. 3. The method of voltage calibration may include, e.g., operations S301-S304.

Referring to FIG. 3, at operation S301, the method may include detecting a current target temperature of the memory cell array;

At operation S302, the method may include performing a read operation on the memory cell array respectively at each of multiple candidate times with a standard read voltage, and obtaining the respective number of the target read fail bits, each of the candidate times corresponds to one of the numbers of the read fail bits.

At operation S303, the method may include determining a target read voltage offset parameter according to the target temperature, the number of the target read fail bits, the candidate time, and the stored target offset function.

At operation S304, the method may include calibrating a read voltage of a read operation on the memory cell array with the target read voltage offset parameter.

It should be understood that the operations shown in the manufacturing method described above are not exclusive, and other operations may be performed before, after or between any of the operations shown. Moreover, the operations S301 and S302 described above may be executed simultaneously or sequentially, and the numerical sequence is just an example of the execution sequence, and the execution sequence is not limited here.

The standard read voltage and the candidate time may be set and stored by the developer in advance. In some examples, the standard read voltage may be related to the threshold voltage of each of memory states of the memory cells in the memory cell array. The threshold voltage may be estimated as an optimal read voltage for performing a read operation on the memory cell array, and may be considered as the read voltage causing the least number of read fail bits. The candidate time is related to the standard read time of the memory cell array. The standard read time may be estimated as an optimal read time for performing a read operation on the memory cell array, which may be considered as the read time causing the least number of read fail bits. The target offset function may be approximately regarded as a curve function, which is set by a developer in advance according to the read operation situation of the memory cell array at different temperatures.

It should be noted that the method of voltage calibration provided in the example of the present disclosure may be manually triggered by a user. For instance, a user manually operating an electronic device may trigger the calibration of the read voltage. Additionally and/or alternatively, voltage calibration may be automatically triggered by the memory. For instance, when a specified time is reached, the calibration of the read voltage is automatically triggered.

In some implementations, the target offset function may be set in advance according to the read operation situation of the memory cell array at different temperatures, and stored in the memory. In the subsequent read voltage calibration processes of the memory cell array, through detecting its read fail bits with the standard read voltage respectively at each of multiple candidate times, and detecting the ambient temperature of the memory cell array, and then calibrating the read voltage in combination with the ambient temperature, the read fail bits and the target offset function, the offset effect of the ambient temperature and the memory itself on the read voltage may be eliminated, the accuracy of the read voltage calibration may be improved, and the failure rate of the read operation may be reduced.

Continue to refer to FIG. 3, the operations S301-S304 described above will be further described below.

Referring again to FIG. 3, at operation S301, the detecting a target temperature of the memory cell array may be implemented through a temperature sensor.

At operation S302, the performing a read operation on the memory cell array respectively at each of multiple candidate times with a standard read voltage may include obtaining the respective number of the target read fail bits, where each of the candidate times corresponds to one of the numbers of the target read fail bits.

In some implementations, the standard read voltage and candidate time may be set and stored by a developer in advance. In some examples, the standard read voltage may be related to the threshold voltage of each of memory states of the memory cell in the memory cell array. The threshold voltage may be estimated as an optimal read voltage for performing a read operation on the memory cell array, and may be considered as the read voltage causing the least number of read fail bits.

The candidate time may be related to the standard read time of the memory cell array. The candidate time may be a plurality of times including the standard read time. The candidate time may be estimated as an optimal read time for performing a read operation on the memory cell array. The standard read time may be considered as the read time causing the least number of read fail bits. For example, if the standard read time is 1 s, the candidate times may include 0.5 s, 1 s and 1.5 s.

A number of the target read fail bits represents an amount of data that failed to be read for a same memory cell array. Some data may fail to be read in each read operation, and when being read at different times, or with different voltages, the amount of data that fails to be read may vary. In some instances, when performing a read operation at a standard read time with standard read voltage, the amount of data that fails to be read is minimal, and ideally zero.

Referring again to FIG. 3, at operation S303, the method may include determining a target read voltage offset parameter according to the target temperature, the number of the target read fail bits, the candidate time, and the stored target offset function.

In some implementations, the target offset function may be approximately regarded as a curve function, which is set by a developer in advance according to the read operation situation of the memory cell array at different temperatures. The target offset function may be stored in a memory. The target read voltage offset parameter may be regarded as the voltage offset from the standard read voltage.

Figure 4:
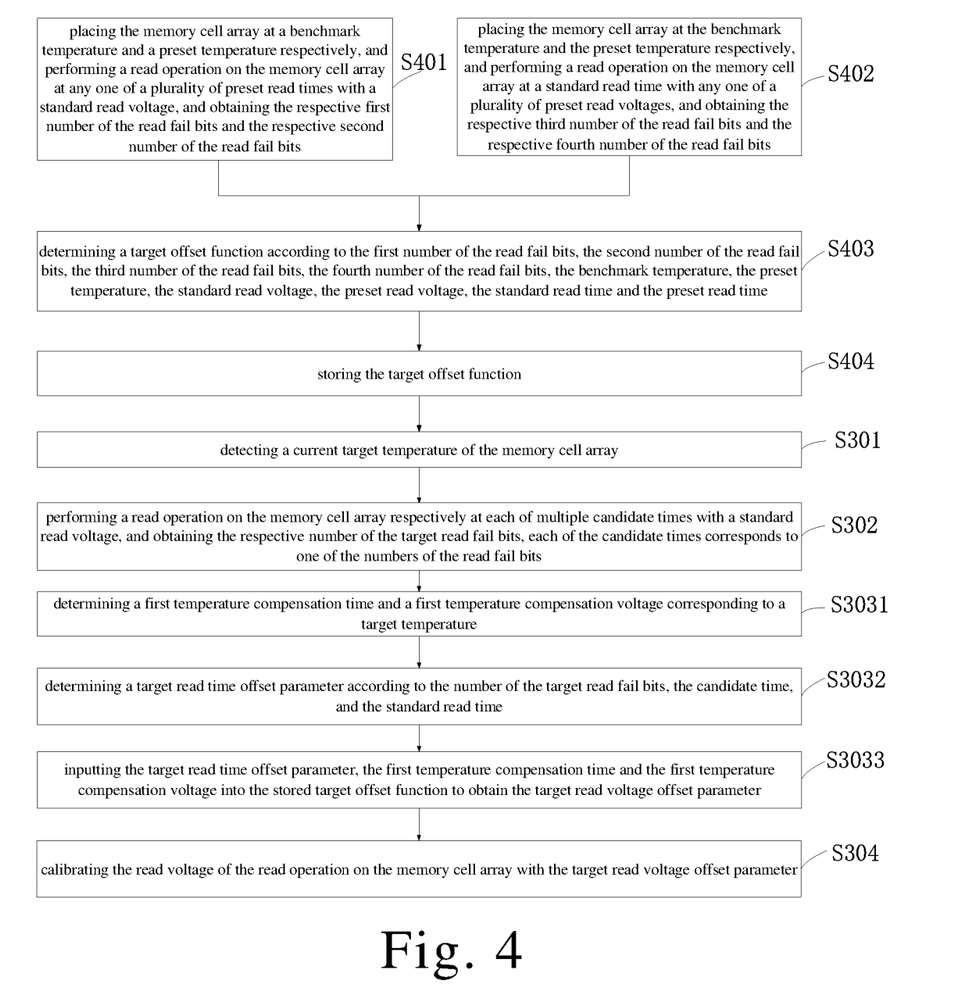
FIG. 4 is another schematic flowchart of a method of voltage calibration provided by an example of the present disclosure.

Referring to FIG. 4, the operation S303 described above in connection with FIG. 3 may include the operations S3031-S3033, as described below.

For example, referring to FIG. 4, at operation S3031, the method may include determining a first temperature-compensation time and a first temperature-compensation voltage corresponding to a target temperature.

In some implementations, since high temperature will have an impact on the performance of the memory itself, the processing speed of the memory may slow down at high temperature. Thus, the memory may provide a temperature compensation for a data read operation. The temperature compensation function mainly sets a compensation time (e.g., a first temperature-compensation time) and a compensation voltage (e.g., a first temperature-compensation voltage) for different temperatures, and adjusts the read time and the read voltage in combination with the compensation time and the compensation voltage. As such, adverse effects of temperature on the read operation of the memory may be excluded.

In some examples, two temperature compensation formulas may be provided. For instance, one formula may calculate the compensation time according to a temperature value, while the other formula may calculate the compensation voltage according to the temperature value. These two formulas may be obtained by a developer based on a large number of experiments.

Referring again to FIG. 4, at operation S3032, the method may include determining a target read time offset parameter according to the number of the target read fail bits, the candidate time, and the standard read time.

In some examples, at operation S3032, the method may include determining the candidate time corresponding to the least number of the target read fail bits among the numbers of the target read fail bits as a target candidate time. At operation S3032, the method may include determining a difference between the target candidate time and the standard read time to obtain a target read time offset parameter.

In some implementations, a larger number of the target read fail bits may represent a worse effect of the read operation at the corresponding read time, and a smaller number of the target read fail bits represents a better effect of the read operation at the corresponding read time. The read time with the best read effect may be set as the target candidate time. For examples, for the candidate time t1~t3, if the number of the target read fail bits at t1 is the least, then t1 is to be as the target candidate time; on the other hand, if the standard read time is T0, then the target read time offset parameter $\Delta t = t1 - T0$, where the target read time offset parameter may be regarded as a time offset from the standard read time, which may include a zero value, a positive number, or a negative number.

Referring again to FIG. 4, at operation S3033, the method may include inputting the target read time offset parameter, the first temperature-compensation time, and the first temperature-compensation voltage into the stored target offset function to obtain the target read voltage offset parameter.

In some implementations, the target offset function may include multiple variables, e.g., read time offset variable, temperature-compensation time variable, and temperature-compensation voltage variable. The target read voltage offset parameter may be calculated according to the actual values of these variables. The target read voltage offset parameter may include a zero value, a positive number, or a negative number.

For example, the target offset function may be a binary linear equation $m(x+b)+n(y+c)=p$, where m, n, and p are known quantities, b is the temperature-compensation time variable, c is the temperature-compensation voltage variable, x is the read time offset variable, and y is the read voltage offset variable. After the value of each of corresponding variables is substituted into the target offset function (e.g., the first temperature-compensation time is taken as the value of the temperature-compensation time variable b, the first temperature-compensation voltage is taken as the value of the temperature-compensation voltage variable c, and the target read time offset parameter is taken as the value of the read time offset variable x), the value corresponding to the read voltage offset variable y may be obtained. The value may be the target read voltage offset parameter.

Referring again to FIG. 4, at operation S304, the method may include calibrating the read voltage of the read operation on the memory cell array with the target read voltage offset parameter.

In some implementations, a sum of the standard read voltage and the target read voltage offset parameter may be calculated as the updated read voltage. Then, during the read operation, the data read operation may be performed with the updated read voltage.

It should be noted that, in some examples, the target offset function described above is designed and stored in the memory during a research and development stage. Still referring to FIG. 4, before the above operation of determining a target read voltage offset parameter according to the target temperature, the first number of the read fail bits, the candidate time, and the stored target offset function, the method of voltage calibration may include operations S401-S404.

For example, at operation S401, the method may include placing the memory cell array at a benchmark temperature and a preset temperature respectively. At operation S401, the method may also include performing a read operation on the memory cell array at any one of a plurality of preset read times with a standard read voltage. At operation S401, the method may further include obtaining the respective first number of the read fail bits and the respective second number of the read fail bits.

At operation S402, the method may include placing the memory cell array at the benchmark temperature and the preset temperature respectively. At operation S402, the method may also include performing a read operation on the memory cell array at a standard read time with any one of a plurality of preset read voltages. At operation S402, the method may further include obtaining the respective third number of the read fail bits and the respective fourth number of the read fail bits.

In some implementations, the benchmark temperature may be a temperature that has no or little impact on the read operation of the memory cell array, e.g., room temperature. Considering that low temperature has little impact on the performance of most memories, and that high temperature has a greater impact on the memory, the preset temperature may be a temperature higher than the benchmark temperature. During actual operation, the memory may be placed in a temperature-controlled room with adjustable temperature. In some examples, the preset read times are multiple of times excluding the standard read time, and the preset read voltages are multiple of voltages excluding the standard read voltage.

In some examples, the reading condition may be controlled through controlling the read voltage and the read time, and the impact of temperature on the read operation may be analyzed by placing the memory at different temperatures. Using the same reading condition for the read operation, and a target offset function related to a temperature, a read time and a read voltage may then be determined. The first number of the read fail bits and the third number of the read fail bits are data reading results measured by only the read time with an offset or the read voltage with an offset at the benchmark temperature. The second number of the read fail bits and the fourth number of the read fail bits are data reading results measured by only the read time with an offset or the read voltage with an offset at a preset temperature different from the benchmark temperature.

At operation S403, the method may include determining a target offset function according to the first number of the read fail bits, the second number of the read fail bits, the third number of the read fail bits, the fourth number of the read fail bits, the benchmark temperature, the preset temperature, the standard read voltage, the preset read voltage, the standard read time, and the preset read time.

At operation S404, the method may include storing the target offset function.

For example, assume the benchmark temperature is H0, the standard read voltage is V0, the standard read time is T0, the preset temperature includes H1~Hn, the preset read voltage includes V1~Vm, and the preset read time includes T1~Tg. Then, for any of the temperatures (e.g., one of H0 and H1~Hn), multiple reading conditions may be set by using the standard read time T0 may as a quantitative value and using different preset read voltages V1~Vm as a single variable (e.g., only the read voltage is offset). Still further, multiple reading conditions may be set by using the standard read voltage V0 as a quantitative value. Using different preset read times T1~Tg as a single variable (e.g., only the read time is offset), by using different reading conditions to perform read operations and obtaining the corresponding data read results (the number of read fail bits), the impact of temperature on the read operation may be analyzed based on the data reading results of the same reading condition at different temperatures. Based on this, an offset function related to a temperature, a read time, and a read voltage may be determined.

Referring again to FIG. 4, in some examples, operation S403 may include determining a temperature difference between each of the preset temperatures and the benchmark temperature, a time difference between each of the preset read times and the standard read time, and a voltage difference between each of the preset read voltages and the standard read voltage. Operation S403 may include determining a benchmark mapping relationship of the read operation on the memory cell array at the benchmark temperature according to the time difference, the voltage difference, the first number of the read fail bits and the third number of the read fail bits. The benchmark mapping relationship may be a one-to-one correspondence between a plurality of read time offset parameters and a plurality of read voltage offset parameters. Operation S403 may include determining a target offset function according to the benchmark mapping relationship, the time difference, the voltage difference, the temperature difference, the first number of the read fail bits, the second number of the read fail bits, the third number of the read fail bits and the fourth number of the read fail bits.

In some implementations, the benchmark mapping relationship may be regarded as a comparison table between the read time offset parameter and the read voltage offset parameter of the memory without the impact of temperature. The read time offset parameter is also the offset from the standard read time. The read voltage offset parameter is also the offset from the standard read voltage.

In some examples, the temperature differences $\Delta h1$~$\Delta hn$ between each of the preset temperatures H1~Hn and the benchmark temperature H0, the time differences $\Delta t1$~$\Delta tg$ between each of the preset read times T1~Tg and the standard read time T0, and the voltage differences $\Delta v1$~$\Delta vm$ between each of the preset read voltages V1~Vm and the standard read voltage V0, may be calculated. Moreover, the comparison table between multiple offset voltages and offset times (benchmark mapping relationship) when the memory is not affected by temperature may be determined according to these differences, Still further, the numbers of read fail bits and the mapping formula between the offset voltage and the offset time of the memory at any temperature (target offset function) may be determined according to the benchmark mapping relationship.

In some examples, the above operation of determining a benchmark mapping relationship of the read operation on the memory cell array at the benchmark temperature according to the time difference, the voltage difference, the first number of the read fail bits and the third number of the read fail bits may include determining a difference between the two first numbers of the read fail bits corresponding to each of the time differences as a first difference. In some examples, the above operation of determining a benchmark mapping relationship of the read operation on the memory cell array at the benchmark temperature according to the time difference, the voltage difference, the first number of the read fail bits and the third number of the read fail bits may include determining a difference between the two third numbers of the read fail bits corresponding to each of the voltages differences as the third difference. In some examples, the above operation of determining a benchmark mapping relationship of the read operation on the memory cell array at the benchmark temperature according to the time difference, the voltage difference, the first number of the read fail bits and the third number of the read fail bits may include determining the benchmark mapping relationship according to the time difference, the first difference, the voltage difference, and the third difference.

For example, for $\Delta t1$ among the time differences $\Delta t1 \sim \Delta tg$, since $\Delta t1=T1-T0$, the first numbers of the read fail bits corresponding to $\Delta t1$ may include both of the first number of the read fail bits corresponding to T1 and T0, respectively. For $\Delta t3$ among the voltage differences $\Delta v1 \sim \Delta vm$, since $\Delta v3=v3-V0$, the third numbers of the read fail bits corresponding to $\Delta v3$ may include both of the third number of the read fail bits corresponding to v3 and V0, respectively. Thus, each voltage difference $\Delta v$ corresponds to a difference of the numbers of bits (the third difference), and each time difference $\Delta t$ corresponds to a difference of the numbers of bits (the first difference).

When all of the first differences between the numbers of bits and third differences between the numbers of bits are calculated, a mapping relationship between offset time and offset voltage may be determined by the way of an approximate linear compensation. In other words, a comparison table (benchmark mapping relationship) between multiple offset times and offset voltages without affecting the memory by temperature may be obtained.

In some examples, the above operation of determining a target offset function according to the benchmark mapping relationship, the time difference, the voltage difference, the temperature difference, the first number of the read fail bits, the second number of the read fail bits, the third number of the read fail bits and the fourth number of the read fail bits may include determining a difference between the two second numbers of the read fail bits corresponding to each of the time differences as the second difference, and determining a difference between the two fourth numbers of the read fail bits corresponding to each of the voltages differences as the fourth difference. In some examples, the above operation of determining a target offset function according to the benchmark mapping relationship, the time difference, the voltage difference, the temperature difference, the first number of the read fail bits, the second number of the read fail bits, the third number of the read fail bits and the fourth number of the read fail bits may include determining a first difference between a first difference of the number of bits and a second difference of the number of bits corresponding to each of temperature differences, and determining a second difference between a third difference of the number of bits and a fourth difference of the number of bits corresponding to each of the temperature differences. In some examples, the above operation of determining a target offset function according to the benchmark mapping relationship, the time difference, the voltage difference, the temperature difference, the first number of the read fail bits, the second number of the read fail bits, the third number of the read fail bits and the fourth number of the read fail bits may include determining the benchmark relationship offset value according to the benchmark mapping relationship, the first difference, the second difference and the temperature difference. In some examples, the above operation of determining a target offset function according to the benchmark mapping relationship, the time difference, the voltage difference, the temperature difference, the first number of the read fail bits, the second number of the read fail bits, the third number of the read fail bits and the fourth number of the read fail bits may include determining a target offset function according to the benchmark relationship offset value and the benchmark mapping relationship.

In some implementations, the benchmark relationship offset value may be equivalent to an offset of the mapping relationship between offset time and offset voltage after combining the temperature factor. This may be equivalent to obtaining the slope a in the linear equation $y=ax$, where x is the offset time and y is the offset voltage.

For example, for $\Delta t1$ among the time differences $\Delta t1 \sim \Delta tg$, since $\Delta t1=T1-T0$, the second numbers of the read fail bits corresponding to $\Delta t1$ may include the two second numbers of the read fail bits corresponding to T1 and T0. For $\Delta t3$ among the voltage differences $\Delta v1 \sim \Delta vm$, since $\Delta v3=v3-V0$, the fourth numbers of the read fail bits corresponding to $\Delta v3$ may include the two fourth numbers of the read fail bits corresponding to v3 and V0. Thus, each voltage difference $\Delta v$ corresponds to a difference of the number of bits (the fourth difference), and each time difference $\Delta t$ corresponds to a difference of the number of bits (the second difference).

Since the first number of the read fail bits and the third number of the read fail bits are the data reading results measured with only offset read time or only offset read voltage at the benchmark temperature, the second number of the read fail bits and the fourth number of the read fail bits are the data reading results measured with only offset read time or only offset read voltage at a preset temperature that is different from the benchmark temperature. Therefore, for a same reading condition (e.g., only offset time or only offset voltage), errors in a difference of the numbers of bits corresponding to the preset temperature and the benchmark temperature may be calculated. In other words, the errors (the first difference and the second difference) generated from reading data in the memory affected by the temperature may be calculated. Based on these errors, an approximate linear compensation method may be configured to adjust the voltage difference $\Delta v$ and time difference $\Delta t$, so that the time difference $\Delta t$ (offset time) and voltage difference $\Delta v$ (offset voltage) roughly conform to input value x and output value y of a linear equation $y=ax$, and the slope a of the linear equation may be as the offset value of the benchmark relationship.

In some examples, the above operation of determining a target offset function according to the benchmark relationship offset value and the benchmark mapping relationship may include obtaining a second temperature-compensation time and a second temperature-compensation voltage corresponding to each of the preset temperatures. In some examples, the above operation of determining a target offset function according to the benchmark relationship offset value and the benchmark mapping relationship may include determining an initial offset function according to the benchmark relationship offset value. In some examples, the above operation of determining a target offset function according to the benchmark relationship offset value and the benchmark mapping relationship may include determining a target offset function according to the initial offset function, the second temperature-compensation time, the second temperature-compensation voltage, and the benchmark mapping relationship.

In some implementations, the second temperature-compensation time and the second temperature-compensation voltage corresponding to each of temperatures may be determined through a temperature compensation formula stored in the memory. In some examples, the initial offset function may be constructed directly according to the offset value of the benchmark relationship. The initial offset function may be $y+c=a(x+b)$, where c is the temperature-compensation voltage variable, b is the temperature-compensation time variable, and a is the benchmark relationship offset value. Subsequently, the calculated actual value of each of variables may be substituted into the initial offset function for test verification, and the initial offset function is manually fine-tuned. As such, each of actual values roughly meets the fine-tuned initial offset function, e.g., $m(x+b)+n(y+c)=p$. Here, m, n and p are obtained after fine-tuning, and the initial offset function after fine-tuning is the target offset function.

Figure 5:
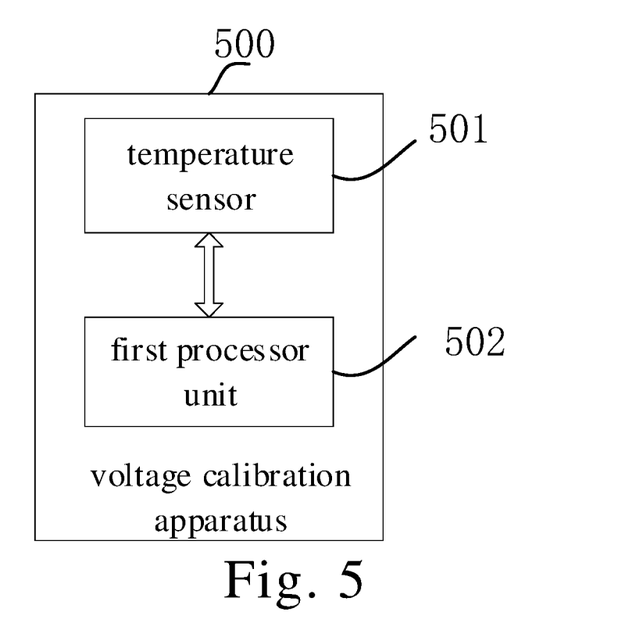
FIG. 5 is a schematic diagram of a structure of an apparatus of voltage calibration provided by an example of the present disclosure.

Based on the method of voltage calibration provided in the examples described above, an example of the present disclosure further provides an apparatus of voltage calibration. A schematic diagram of a structure of an apparatus of voltage calibration 500 provided by an example of the present disclosure is shown in FIG. 5. The apparatus of voltage calibration 500 is applied in a memory that includes a memory cell array.

The apparatuses of voltage calibration 500 may include a temperature sensor 501, which is configured to detect a current target temperature of the memory cell array. The apparatuses of voltage calibration 500 may include a first processing unit 502. The first processing unit 502 may be electrically connected to the memory cell array and the temperature sensor 501. The first processing unit 502 may be configured to perform a read operation on the memory cell array respectively at each of multiple candidate times with a standard read voltage. The first processing unit 502 may be configured to obtain the respective number of the target read fail bits, where each of the candidate times corresponds to one of the numbers of the target read fail bits. The first processing unit 502 may be configured to determine a target read voltage offset parameter according to the target temperature, the number of the target read fail bits, the candidate time, and the stored target offset function. The first processing unit 502 may be configured to calibrate a read voltage of a read operation on the memory cell array with the target read voltage offset parameter.

In some implementations, the standard read voltage and candidate time may be set and stored by a developer in advance. In some examples, the standard read voltage is related to the threshold voltage of each of memory states of the memory cell in the memory cell array. The threshold voltage is estimated to be an optimal read voltage for performing a read operation on the memory cell array, and may be considered as the read voltage causing the least number of read fail bits.

The candidate time is related to the standard read time of the memory cell array, which may be a plurality of times including the standard read time. The standard read time is estimated to be an optimal read time for performing a read operation on the memory cell array, which may be considered as the read time causing the least number of read fail bits. For example, if the standard read time is 1 s, the candidate times may include 0.5 s, Is and 1.5 s.

The number of the target read fail bits represents the amount of data that failed to be read. For a same memory cell array, some data may fail to be read in each read operation, and when being read at different times, or with different voltages, the amount of data that fails to be read may vary. In some examples, when performing a read operation at a standard read time and with standard read voltage, the amount of data that fails to be read is minimal, ideally zero.

The target offset function may be approximately regarded as a curve function, which is set by a developer in advance according to situation of the read operation on the memory cell array at different temperatures and stored in a memory. The target read voltage offset parameter may be regarded as the voltage offset from the standard read voltage.

Referring to FIG. 5, in some examples, the first processing unit 502 may be configured to determine a first temperature-compensation time and a first temperature-compensation voltage corresponding to a target temperature. The first processing unit 502 may be configured to determine a target read time offset parameter according to the number of the target read fail bits, the candidate time, and the standard read time. The first processing unit 502 may be configured to input the target read time offset parameter, the first temperature-compensation time and the first temperature-compensation voltage into the stored target offset function to obtain the target read voltage offset parameter.

In some implementations, since high temperature will have a certain impact on the performance of the memory itself, e.g., the processing speed of the memory will slow down at high temperature. Thus, the memory may provide a temperature compensation function for data read operation. The temperature compensation function mainly sets a compensation time (a first temperature-compensation time) and a compensation voltage (a first temperature-compensation voltage) for different temperatures, and adjusts the read time and the read voltage with the compensation time and the compensation voltage. IN this way, adverse effects of temperature on the read operation of the memory may be reduced and/or eliminated.

In some examples, two temperature compensation formulas may be provided, where one formula may calculate the compensation time according to the temperature value, and the other formula may calculate the compensation voltage according to the temperature value. These two formulas may be obtained by a developer based on a large number of experiments.

The target offset function may include multiple variables, e.g., read time offset variable, temperature-compensation time variable, and temperature-compensation voltage variable. The target read voltage offset parameter may be calculated according to the actual values of these variables, and the target read voltage offset parameter may include a value of zero, a positive number, or a negative number.

For example, the target offset function may be a binary linear equation $m(x+b)+n(y+c)=p$, where m, n and p are known quantities, b is the temperature-compensation time variable, c is the temperature-compensation voltage variable, x is the read time offset variable, and y is the read voltage offset variable. After the values of respective variables are input into the target offset function (e.g., the first temperature-compensation time is taken as the value of the temperature-compensation time variable b, the first temperature-compensation voltage is taken as the value of the temperature-compensation voltage variable c, and the target read time offset parameter is taken as the value of the read time offset variable x), the value corresponding to the read voltage offset variable y may be obtained. The value may be the target read voltage offset parameter.

In some examples, referring to FIG. 5, the first processing unit 502 may be configured to determine the candidate time corresponding to the least number of the target read fail bits among the numbers of the target read fail bits as the target candidate time. The first processing unit 502 may be configured to determine the difference between the target candidate time and the standard read time to obtain the target read time offset parameter.

In some implementations, a larger value of the number of the target read fail bits may represents a worse effect of the read operation at the corresponding read time, and a smaller value may represent a better effect of the read operation at the corresponding read time. The read time with the best read effect may be set as the target candidate time. For example, for the candidate time t1~t3, if the number of the target read fail bits at t1 is the least, then t1 is as the target candidate time; and if the standard read time is T0, then the target read time offset parameter $\Delta t = t1 - T0$. The target read time offset parameter may be regarded as a time offset from the standard read time, which may include a value of zero, a positive number, or a negative number.

Figure 6:
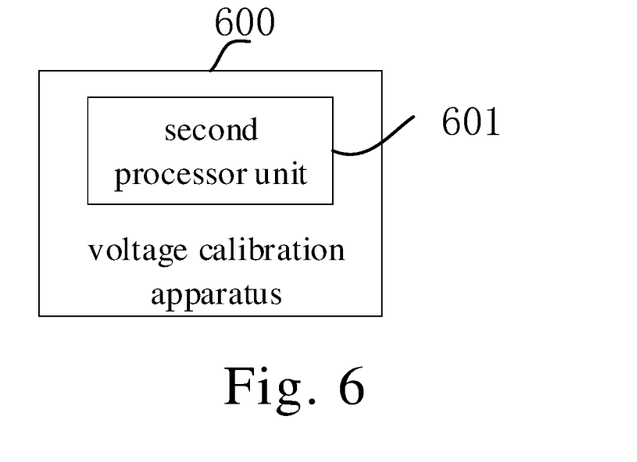
FIG. 6 is schematic diagram of a structure of another apparatus of voltage calibration provided by an example of the present disclosure.

Based on the method of voltage calibration provided by the examples described above, an example of the present disclosure further provides another apparatus of voltage calibration. FIG. 6 is schematic diagram of a structure of another apparatus of voltage calibration 600 provided by an example of the present disclosure. The apparatus of voltage calibration 600 is applied to testing electronic device in the research and development stage. The apparatus of voltage calibration 600 may include a second processing unit 601 electrically connected to the memory that includes a memory cell array.

Referring to FIG. 6, the second processing unit 601 may be configured to place the memory cell array at a benchmark temperature and a preset temperature respectively. The second processing unit 601 may be configured to perform a read operation on the memory cell array at any one of a plurality of preset read times with a standard read voltage. The second processing unit 601 may be configured to obtain the respective first number of the read fail bits and the respective second number of the read fail bits. The second processing unit 601 may be configured to place the memory cell array at the benchmark temperature and the preset temperature respectively. The second processing unit 601 may be configured to perform a read operation on the memory cell array with any one of a plurality of preset read voltages and at a standard read time The second processing unit 601 may be configured to obtain the respective third number of the read fail bits and the respective fourth number of the read fail bits. The second processing unit 601 may be configured to determine a target offset function according to the first number of the read fail bits, the second number of the read fail bits, the third number of the read fail bits, the fourth number of the read fail bits, the benchmark temperature, the preset temperature, the standard read voltage, the preset read voltage, the standard read time, and the preset read time. The second processing unit 601 may be configured to store the target offset function in the memory.

In some implementations, the benchmark temperature may be a temperature that has no or little impact on the read operation of the memory cell array, e.g., room temperature. Low temperature has little impact on the performance of most memories, while high temperature has a greater impact. Thus, the preset temperature may be a temperature higher than the benchmark temperature, and during actual operation, the memory may be placed in a temperature-controlled room with adjustable temperature. In some examples, the preset read times are multiple of times excluding the standard read time, and the preset read voltages are multiple of voltages excluding the standard read voltage.

In some examples, the reading condition may be controlled by controlling the read voltage and the read time. The impact of temperature on the read operation may be analyzed by placing the memory at different temperatures and adopting the same reading conditions for the read operation. Then, a target offset function related to a temperature, read time and read voltage may be determined. The first number of the read fail bits and the third number of the read fail bits may be data reading results measured by only the read time with an offset or the read voltage with an offset at the benchmark temperature. The second number of the read fail bits and the fourth number of the read fail bits are data reading results measured by only the read time with an offset or the read voltage with an offset at a preset temperature different from the benchmark temperature.

For example, assuming that the benchmark temperature is H0, the standard read voltage is V0, the standard read time is T0, the preset temperature includes H1~Hn, the preset read voltage includes V1~Vm, and the preset read time includes T1~Tg. Then, for any of the temperatures (e.g., one of H0 and H1~Hn), multiple reading conditions may be set by using the standard read time T0 as a quantitative value and different preset read voltages V1~Vm as a single variable (e.g., only the read voltage is offset). Multiple reading conditions may be set by using the standard read voltage V0 as a quantitative value and different preset read times T1~Tg as a single variable (e.g., only the read time is offset). Using different reading conditions to perform read operations and obtaining the corresponding data read results (read fail bits), the impact of temperature on the read operation may be analyzed based on the data reading results of the same reading condition at different temperatures. Then, a target offset function related to a temperature, read time, and read voltage may be determined.

In some examples, the second processing unit 601 may be configured to determine a temperature difference between each of the preset temperatures and the benchmark temperature, a time difference between each of the preset read times and the standard read time, and a voltage difference between each of the preset read voltages and the standard read voltage. In some examples, the second processing unit 601 may be configured to determine a benchmark mapping relationship of the read operation on the memory cell array at the benchmark temperature according to the time difference, the voltage difference, the first number of the read fail bits, and the third number of the read fail bits. The benchmark mapping relationship may be a one-to-one correspondence between a plurality of read time offset parameters and a plurality of read voltage offset parameters. In some examples, the second processing unit 601 may be configured to determine the target offset function according to the benchmark mapping relationship, the time difference, the voltage difference, the temperature difference, the first number of the read fail bits, the second number of the read fail bits, the third number of the read fail bits, and the fourth number of the read fail bits.

In some implementations, the benchmark mapping relationship may be regarded as a comparison table between the read time offset parameter and the read voltage offset parameter of the memory without the impact of temperature, and the read time offset parameter is also the offset from the standard read time, and the read voltage offset parameter is also the offset from the standard read voltage.

In some examples, the temperature differences $\Delta h1 \sim \Delta hn$ between each of the preset temperatures $H1 \sim Hn$ and the benchmark temperature $H0$, the time differences $\Delta t1 \sim \Delta tg$ between each of the preset read times $T1 \sim Tg$ and the standard read time $T0$, and the voltage differences $\Delta v1 \sim \Delta vm$ between each of the preset read voltages $V1 \sim Vm$ and the standard read voltage $V0$ may be calculated. The comparison table between multiple offset voltages and offset times (benchmark mapping relationship) without the effect of temperature on the memory may be determined according to these differences and the number of read fail bits; and the mapping formula between the offset voltage and the offset time of the memory at any temperature (target offset function) may be determined according to the benchmark mapping relationship.

In some examples, the second processing unit 601 may be configured to determine a benchmark mapping relationship of the read operation on the memory cell array at the benchmark temperature according to the time difference, the voltage difference, the first number of the read fail bits and the third number of the read fail bits. The benchmark mapping relationship may be a one-to-one correspondence between a plurality of read time offset parameters and a plurality of read voltage offset parameters. In some examples, the second processing unit 601 may be configured to determine the benchmark relationship offset value according to the benchmark mapping relationship, the time difference, the voltage difference, the temperature difference, the first number of the read fail bits, the second number of the read fail bits, the third number of the read fail bits and the fourth number of the read fail bits. In some examples, the second processing unit 601 may be configured to determine the target offset function according to the benchmark relationship offset value and the benchmark mapping relationship.

For example, for $\Delta t1$ among the time differences $\Delta t1 \sim \Delta tg$, since $\Delta t1 = T1 - T0$, the first numbers of the read fail bits corresponding to $\Delta t1$ may include the two first numbers of the read fail bits corresponding to $T1$ and $T0$. For $\Delta t3$ among the voltage differences $\Delta v1 \sim \Delta vm$, since $\Delta v3 = v3 - V0$, the third numbers of the read fail bits corresponding to $\Delta v3$ may include the two third numbers of the read fail bits corresponding to $v3$ and $V0$. Thus, each voltage difference $\Delta v$ corresponds to a difference of the number of bits (the third difference), and each time difference $\Delta t$ corresponds to a difference of the number of bits (the first difference).

When all of the first differences and third differences of the number of bits are calculated, an approximate linear compensation method may be configured to determine the mapping relationship between offset time and offset voltage. That is, a comparison table (benchmark mapping relationship) between multiple offset times and offset voltages is obtained without affecting the memory by temperature.

In some examples, the second processing unit 601 may be configured to determine a difference between the two second numbers of the read fail bits corresponding to each of the time differences as the second difference. In some examples, the second processing unit 601 may be configured to determine a difference between the two fourth numbers of the read fail bits corresponding to each of the voltages differences as the fourth difference. In some examples, the second processing unit 601 may be configured to determine the first difference between the first difference and the second difference corresponding to each of the temperature differences. In some examples, the second processing unit 601 may be configured to determine the second difference between the third difference and the fourth difference corresponding to each of the temperature differences. In some examples, the second processing unit 601 may be configured to determine the benchmark relationship offset value according to the benchmark mapping relationship, the first difference, the second difference and the temperature difference. In some examples, the second processing unit 601 may be configured to determine the target offset function according to the benchmark relationship offset value and the benchmark mapping relationship.

In some implementations, the benchmark relationship offset value may be equivalent to an offset of the mapping relationship between offset time and offset voltage after combining the temperature factor, which is equivalent to obtaining the slope a in the linear equation $y = ax$, where x is the offset time and y is the offset voltage.

For example, for $\Delta t1$ among the time differences $\Delta t1 \sim \Delta tg$, since $\Delta t1 = T1 - T0$, the second numbers of the read fail bits corresponding to $\Delta t1$ may include the two second numbers of the read fail bits corresponding to $T1$ and $T0$. For $\Delta t3$ among the voltage differences $\Delta v1 \sim \Delta vm$, since $\Delta v3 = v3 - V0$, the fourth numbers of the read fail bits corresponding to $\Delta v3$ may be the two fourth numbers of the read fail bits corresponding to $v3$ and $V0$. Thus, each voltage difference $\Delta v$ corresponds to a difference of the number of bits (the fourth difference), and each time difference $\Delta t$ corresponds to a difference of the number of bits (the second difference).

The first number of the read fail bits and the third number of the read fail bits are the data reading results measured with only offset read time or only offset read voltage at the benchmark temperature. The second number of the read fail bits and the fourth number of the read fail bits are the data reading results measured with only offset read time or only offset read voltage at a preset temperature that is different from the benchmark temperature. Therefore, for a same reading condition (e.g., only offset time or only offset voltage), errors in a difference of the numbers of bits corresponding to the preset temperature and the benchmark temperature may be calculated. That is, the errors (the first difference and the second difference) generated from reading data in the memory affected by the temperature may be calculated. Based on these errors, an approximate linear compensation method is configured to adjust the voltage difference $\Delta v$ and time difference $\Delta t$, so that the time difference $\Delta t$ (offset time) and voltage difference $\Delta v$ (offset voltage) roughly conform to input value x and output value y of a linear equation $y = ax$, and the slope a of the linear equation may be as the offset value of the benchmark relationship.

In some examples, the second processing unit 601 may be configured to obtain a second temperature-compensation time and a second temperature-compensation voltage corresponding to each of the preset temperatures. In some examples, the second processing unit 601 may be configured to determine an initial offset function according to the benchmark relationship offset value. In some examples, the second processing unit 601 may be configured to determine the target offset function according to the initial offset function, the second temperature-compensation time, the second temperature-compensation voltage, and the benchmark mapping relationship.

In some implementations, the second temperature-compensation time and the second temperature-compensation voltage corresponding to each temperature may be determined through a temperature compensation formula stored in the memory. In some examples, the initial offset function may be constructed directly according to the offset value of the benchmark relationship. The initial offset function may be $y+c=a(x+b)$, where c is the temperature-compensation voltage variable, b is the temperature-compensation time variable, and a is the benchmark relationship offset value. Subsequently, the calculated actual values of each of variables are put into the initial offset function for test verification, and the initial offset function is manually fine-tuned. So that each of actual values roughly meets the fine-tuned initial offset function, e.g., $m(x+b)+n(y+c)=p$, where m, n and p are obtained after fine-tuning. The initial offset function after fine-tuning is the target offset function.

It can be seen from the above, the method of voltage calibration and apparatus thereof, memory and memory system provided by examples of the present disclosure, in the process of read voltage calibration on the memory cell array, through detecting the number of read fail bits with the standard read voltage respectively at each of multiple candidate times, and detecting the ambient temperature of the memory cell array, and then calibrating the read voltage with the ambient temperature, the number of read fail bits and the stored target offset function, it may eliminate the offset effect of the read voltage due to the changes of the ambient temperature and the memory itself, improve the accuracy of the read voltage calibration, and reduce the failure rate of the read operation.

The above description is only examples of the application, and is not intended to limit the application, and any modification, equivalent replacement and improvement, etc., made within the spirit and principles of this application shall be included within the protection scope of this application.

What is claimed is:

1. A method of voltage calibration, comprising:
   detecting a target temperature of a memory cell array;
   performing a read operation on the memory cell array at each of multiple candidate times with a standard read voltage;
   obtaining a number of target read fail bits, each of the multiple candidate times corresponding to a respective one of the number of the target read fail bits;
   determining a target read voltage offset parameter according to the target temperature, a difference between a target candidate time of the multiple candidate times that corresponds to a least number of the target read fail bits from among the number of the target read fail bits and a standard read time, and a stored target offset function; and
   calibrating a target read voltage of the read operation on the memory cell array with the target read voltage offset parameter.

2. The method of claim 1, wherein the determining the target read voltage offset parameter according to the target temperature, the difference between the target candidate time of the multiple candidate times that corresponds to the least number of the target read fail bits from among the number of the target read fail bits and the standard read time, and the stored target offset function comprises:
   determining a first temperature-compensation time and a first temperature-compensation voltage corresponding to the target temperature;
   determining a target read time offset parameter according to the difference between the target candidate time and the standard read time; and
   inputting the target read time offset parameter, the first temperature-compensation time and the first temperature-compensation voltage into the stored target offset function to obtain the target read voltage offset parameter.

3. The method of claim 2, wherein the determining the target read time offset parameter according to the difference between the target candidate time and the standard read time comprises:
   determining the target candidate time from among the multiple candidate times that corresponds to the least number of the target read fail bits from among the number of the target read fail bits; and
   determining the difference between the target candidate time and the standard read time to obtain the target read time offset parameter.

4. The method of claim 1, wherein, before determining the target read voltage offset parameter according to the target temperature, the difference between the target candidate time of the multiple candidate times that corresponds to the least number of the target read fail bits from among the number of the target read fail bits and the standard read time, and the stored target offset function, the method further comprises:
   placing the memory cell array at a benchmark temperature and a preset temperature respectively;
   performing a read operation on the memory cell array at any one of a plurality of preset read times with a standard read voltage;
   obtaining a first number of the target read fail bits and a second number of the target read fail bits;
   placing the memory cell array at the benchmark temperature and the preset temperature respectively;
   performing a read operation on the memory cell array with any one of a plurality of preset read voltages and a standard read time;
   obtaining a third number of the target read fail bits and a fourth number of the target read fail bits;
   determining a target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time; and
   storing the target offset function.

5. The method of claim 4, wherein the determining the target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time comprises:
   determining a temperature difference between each of the preset temperatures and the benchmark temperature, a time difference between each of the preset read times and the standard read time, and a voltage difference between each of the preset read voltages and the standard read voltage;

determining a benchmark mapping relationship of the read operation on the memory cell array at the benchmark temperature according to the time difference, the voltage difference, the first number of the target read fail bits, and the third number of the target read fail bits, the benchmark mapping relationship being a one-to-one correspondence between a plurality of read time offset parameters and a plurality of read voltage offset parameters; and determining the target offset function according to the benchmark mapping relationship, the time difference, the voltage difference, the temperature difference, the first number of the target read fail bits, the second number of the target read fail bits, the third number of the target read fail bits, and the fourth number of the target read fail bits.

6. The method of claim 5, wherein the determining the benchmark mapping relationship of the read operation on the memory cell array at the benchmark temperature according to the time difference, the voltage difference, the first number of the target read fail bits, and the third number of the target read fail bits comprises:

determining a difference of the numbers of bits between two of the first number of the target read fail bits corresponding to each of the time differences as a first difference;

determining a difference of the numbers of bits between two of the third number of the target read fail bits corresponding to each of the voltages differences as a third difference; and determining the benchmark mapping relationship according to the time difference, the first difference, the voltage difference, and the third difference.

7. The method of claim 6, wherein the determining the target offset function according to the benchmark mapping relationship, the time difference, the voltage difference, the temperature difference, the first number of the target read fail bits, the second number of the target read fail bits, the third number of the target read fail bits, and the fourth number of the target read fail bits comprises:

determining a difference between two of the second number of the target read fail bits corresponding to each of the time differences as a second difference;

determining a difference between two of the fourth numbers of the target read fail bits corresponding to each of the voltages differences as a fourth difference;

determining a first difference between the first difference and the second difference corresponding to each of the temperature differences;

determining a second difference between the third difference and the fourth difference corresponding to each of the temperature differences;

determining a benchmark relationship offset value according to the benchmark mapping relationship, the first difference, the second difference, and the temperature difference; and determining the target offset function according to the benchmark relationship offset value and the benchmark mapping relationship.

8. The method of claim 7, wherein the determining the target offset function according to the benchmark relationship offset value and the benchmark mapping relationship comprises:

obtaining a second temperature-compensation time and a second temperature-compensation voltage corresponding to each of the preset temperatures;

determining an initial offset function according to the benchmark relationship offset value; and determining the target offset function according to the initial offset function, the second temperature-compensation time, the second temperature-compensation voltage, and the benchmark mapping relationship.

9. An apparatus of voltage calibration, comprising:
a temperature sensor configured to:
detect a current target temperature of a memory cell array;
a processing unit electrically connected to the memory cell array and the temperature sensor and configured to:
perform a read operation on the memory cell array respectively at each of multiple candidate times with a standard read voltage;
obtain a number of target read fail bits, each of the multiple candidate times corresponding to a respective one of the number of the target read fail bits;
determine a target read voltage offset parameter according to the target temperature, a difference between a target candidate time of the multiple candidate times that corresponds to a least number of the target read fail bits from among the number of the target read fail bits and a standard read time, and a stored target offset function; and
calibrate a read voltage of the read operation on the memory cell array with the target read voltage offset parameter.

10. The apparatus of claim 9, wherein, to determine the target read voltage offset parameter according to the target temperature, the difference between the target candidate time of the multiple candidate times that corresponds to the least number of the target read fail bits from among the number of the target read fail bits and the standard read time, the processing unit is configured to:

determine a first temperature-compensation time and a first temperature-compensation voltage corresponding to the target temperature;

determine a target read time offset parameter according to the difference between the target candidate time and the standard read time; and input the target read time offset parameter, the first temperature-compensation time, and the first temperature-compensation voltage into the stored target offset function to obtain the target read voltage offset parameter.

11. The apparatus of claim 10, wherein, to determine the target read time offset parameter according to the difference between the target candidate time and the standard read time, the processing unit is configured to:

determine the target candidate time from among the multiple candidate times that corresponds to the least number of the target read fail bits from among the number of the target read fail bits; and determine the difference between the target candidate time and the standard read time to obtain the target read time offset parameter.

12. The apparatus of claim 9, wherein, before determining the target read voltage offset parameter according to the target temperature, the difference between the target candidate time of the multiple candidate times that corresponds to the least number of the target read fail bits from among the number of the target read fail bits and the standard read time, and the stored target offset function, the processing unit is configured to:

place the memory cell array at a benchmark temperature and a plurality of preset temperatures respectively;

perform a read operation on the memory cell array at any one of a plurality of preset read times with a standard read voltage;

obtain a first number of the target read fail bits and a second number of the target read fail bits;

place the memory cell array at the benchmark temperature and the plurality of preset temperatures respectively;

perform a read operation on the memory cell array with any one of a plurality of preset read voltages and a standard read time;

obtain a third number of the target read fail bits and a fourth number of the target read fail bits;

determine a target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time; and store the target offset function.

13. The apparatus of claim 12, wherein, to determine the target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time, the processing unit is configured to:

determine a temperature difference between each of the preset temperatures and the benchmark temperature, a time difference between each of the preset read times and the standard read time, and a voltage difference between each of the preset read voltages and the standard read voltage;

determine a benchmark mapping relationship of the read operation on the memory cell array at the benchmark temperature according to the time difference, the voltage difference, the first number of the target read fail bits, and the third number of the target read fail bits, the benchmark mapping relationship being a one-to-one correspondence between a plurality of read time offset parameters and a plurality of read voltage offset parameters; and determine the target offset function according to the benchmark mapping relationship, the time difference, the voltage difference, the temperature difference, the first number of the target read fail bits, the second number of the target read fail bits, the third number of the target read fail bits, and the fourth number of the target read fail bits.

14. The apparatus of claim 13, wherein, to determine the benchmark mapping relationship of the read operation on the memory cell array at the benchmark temperature according to the time difference, the voltage difference, the first number of the target read fail bits, and the third number of the target read fail bits, the processing unit is configured to:

determine a difference of the numbers of bits between two of the first number of the target read fail bits corresponding to each of the time differences as a first difference;

determine a difference of the numbers of bits between two of the third number of the target read fail bits corresponding to each of the voltages differences as a third difference; and determine the benchmark mapping relationship according to the time difference, the first difference, the voltage difference, and the third difference.

15. The apparatus of claim 14, wherein, to determine the target offset function according to the benchmark mapping relationship, the time difference, the voltage difference, the temperature difference, the first number of the target read fail bits, the second number of the target read fail bits, the third number of the target read fail bits, and the fourth number of the target read fail bits, the processing unit is configured to:

determining a difference between two of the second number of the target read fail bits corresponding to each of the time differences as a second difference;

determining a difference between two of the fourth number of the target read fail bits corresponding to each of the voltages differences as a fourth difference;

determining a first difference between the first difference and the second difference corresponding to each of the temperature differences;

determining a second difference between the third difference and the fourth difference corresponding to each of the temperature differences;

determining a benchmark relationship offset value according to the benchmark mapping relationship, the first difference, the second difference, and the temperature difference; and determining the target offset function according to the benchmark relationship offset value and the benchmark mapping relationship.

16. An apparatus of voltage calibration, comprising:

a memory including a memory cell array; and a processing unit coupled to the memory cell array and configured to:

place the memory cell array at a benchmark temperature and a plurality of preset temperatures respectively;

perform a read operation on the memory cell array at any one of a plurality of preset read times with a standard read voltage;

obtain a first number of target read fail bits and a second number of the target read fail bits;

place the memory cell array at the benchmark temperature and the plurality of preset temperatures respectively;

perform a read operation on the memory cell array with any one of a plurality of preset read voltages and a standard read time;

obtain a third number of the target read fail bits and a fourth number of the target read fail bits;

determine a target offset function according to the first number of the target read fail bits, the second number of the target read fail bits, the third number of the target read fail bits, the fourth number of the target read fail bits, the benchmark temperature, the preset temperature, the standard read voltage, the preset read voltage, the standard read time, and the preset read time; and store the target offset function in the memory.

17. The apparatus of claim 16, wherein the processing unit is configured to:

determine a temperature difference between each of the preset temperatures and the benchmark temperature, a time difference between each of the preset read times and the standard read time, and a voltage difference between each of the preset read voltages and the standard read voltage;

determine a benchmark mapping relationship of the read operation on the memory cell array in at the benchmark temperature according to the time difference, the voltage difference, the first number of the target read fail bits and the third number of the target read fail bits, the benchmark mapping relationship being a one-to-one correspondence between a plurality of read time offset parameters and a plurality of read voltage offset parameters; and determine the target offset function according to the benchmark mapping relationship, the time difference, the voltage difference, the temperature difference, the first number of the target read fail bits, the second number of the target read fail bits, the third number of the target read fail bits, and the fourth number of the target read fail bits.

18. The apparatus of claim 17, wherein the processing unit is configured to:

determine a benchmark mapping relationship of the read operation on the memory cell array at the benchmark temperature according to the time difference, the voltage difference, the first number of the target read fail bits and the third number of the target read fail bits, the benchmark mapping relationship being a one-to-one correspondence between a plurality of read time offset parameters and a plurality of read voltage offset parameters;

determine a benchmark relationship offset value according to the benchmark mapping relationship, the time difference, the voltage difference, the temperature difference, the first number of the target read fail bits, the second number of the target read fail bits, the third number of the target read fail bits, and the fourth number of the target read fail bits; and determine the target offset function according to the benchmark relationship offset value and the benchmark mapping relationship.

19. The apparatus of claim 18, wherein the processing unit is configured to:

determine a difference between two of the first number of the target read fail bits corresponding to each of the time differences as a first difference;

determine a difference between two of the second number of the target read fail bits corresponding to each of the time differences as a second difference;

determine a difference between two of the third number of the target read fail bits corresponding to each of the time differences as a third difference;

determine a difference between two of the fourth number of the target read fail bits corresponding to each of the voltages differences as a fourth difference;

determine a first difference between the first difference and the second difference corresponding to each of the temperature differences;

determine a second difference between the third difference and the fourth difference corresponding to each of the temperature differences;

determine the benchmark relationship offset value according to the benchmark mapping relationship, the first difference, the second difference, and the temperature difference; and determine the target offset function according to the benchmark relationship offset value and the benchmark mapping relationship.

20. The apparatus of claim 19, wherein the processing unit is configured to:

obtain a second temperature-compensation time and a second temperature-compensation voltage corresponding to each of the preset temperatures;

determine an initial offset function according to the benchmark relationship offset value; and determine the target offset function according to the initial offset function, the second temperature-compensation time, the second temperature-compensation voltage, and the benchmark mapping relationship.

* * * * *